C. L. TUCKER.

Package for Holding and Shipping Lard.

No. 3,038. Reissued July 14, 1868

Witnesses
L. L. Lane
C. H. Wills

Inventor
Charles L. Tucker.

R. PETERS, Photo-Lithographer, Washington, D. C.

UNITED STATES PATENT OFFICE.

CHARLES L. TUCKER, OF CHICAGO, ILLINOIS.

IMPROVED MANUFACTURE OF LARD.

Specification forming part of Letters Patent No. 63,268, dated July 2, 1867; Reissue No. 3,038, dated July 14, 1868.

*To all whom it may concern:*

Be it known that I, CHARLES LA FAYETTE TUCKER, of Chicago, in the State of Illinois, have invented a certain new and Improved Package for Holding and Shipping Lard; and I do declare that the following is a full, clear, and exact description thereof, reference being had to the accompanying drawings, making a part of this specification, in which—

Figure 1:
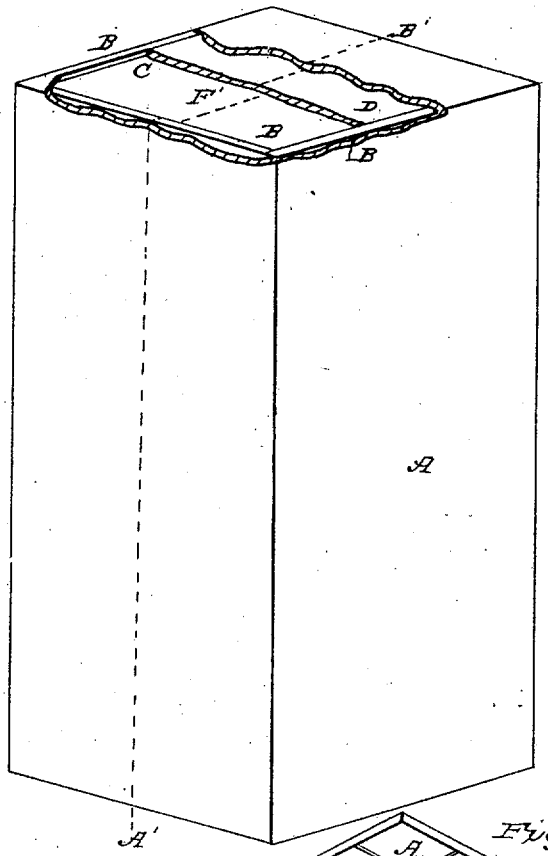
Figure 2:
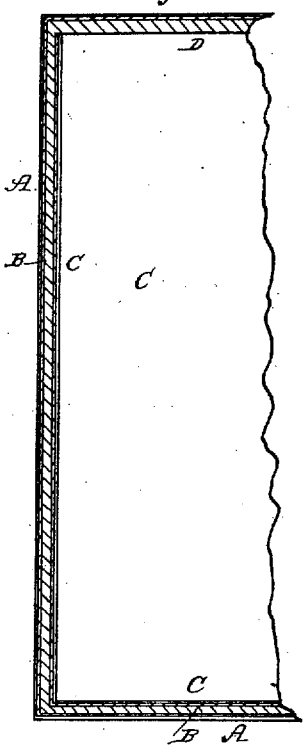
Figure 3:
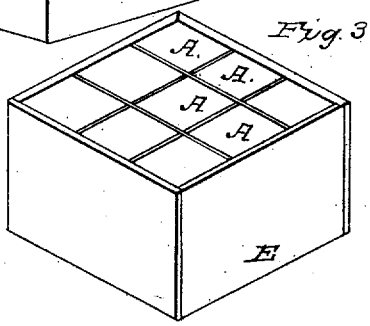

Figure 1 is a perspective view with a portion of the top removed; Fig. 2, a vertical section, showing one side; Fig. 3, a perspective view of a case inclosing nine of the packages.

Like letters refer to the same parts in all the figures.

Lard has been heretofore packed in tierces, barrels, kegs, tubs, and pails, and in shipping the package is exposed to the direct rays of the sun. When so packed it is subject to great loss from absorption and leakage, especially in warm weather, even when not exposed to the direct rays of the sun. As at present handled it is the most inconvenient and unprofitable article which the retailer deals in. It has been sometimes packed in tin, but only to a limited extent, tin being very expensive for small packages and opened with difficulty.

My invention consists in overcoming these difficulties and in constructing a small, cheap, and perfectly tight package of wood or paper, or both, for holding lard, so that it can be handled without waste or inconvenience; in giving such package a lining or coating impervious to and insoluble in oil, either by applying the substance used for such coating directly to the package, or by the use of a paper or other suitable lining coated with such substance; in so constructing such package or box that there will be no lid or cover-rim to interfere with packing in cases; in providing such package with an outer covering of tin or lead foil or tin or lead foil paper.

To enable others skilled in the art to make and use my invention, I proceed to describe its construction and operation.

I construct my package square for economy of space, though it may be made round. The body of the package can be most conveniently made of a single thin strip of wood, which strips may be cut by any machinery in use for that purpose, and may be from one-sixteenth to one-eighth of an inch in thickness and of sufficient width for the required depth of the box to be made. I find it most convenient for the trade to make packages containing one, three, five, and ten pounds, respectively, though other sizes can be used. The interior dimensions of a box calculated to hold one pound in its best form should be four inches by two and a half inches square and three and a half inches deep, and for a box designed to hold ten pounds six and three-fourths inches square and seven and one-half inches deep. The dimensions of other sizes can be readily determined. As I use a single piece for the body or sides, there is only a single joint, which may be secured by glue. The bottom, which is about three-eighths of an inch thick, I insert within the body or sides and secure the same thereto by the use of tacks, glue, or other suitable means. I then apply to the inside a surfacing of gum-arabic in solution. In preparing this solution I usually add a little glycerine, glue, or isinglass to prevent cracking. The use of glycerine I also find advantageous on account of its antiseptic quality. By the use of such coating the pores and seams of the wood and openings caused by imperfect construction are effectually closed, and waste from leakage and absorption entirely prevented. I attain the same results by lining the package with paper or other suitable substance coated or saturated with the solution used, or by saturating the box itself. Several other substances may be used for the coating in place of gum-arabic, such as shellac, stearic acid; but I prefer gum-arabic, as it is not only insoluble in oil, but is inodorous, and perfectly harmless in case any of its particles become mixed with the lard.

Common paste or straw board may be used in constructing my package; but I prefer to make the top and bottom of wood, inserted and secured as described.

When the packages have been prepared as described they are to be filled with lard at as low a temperature as can be used and permit a ready flow. When sufficiently filled the top, having been first provided with the coating or lining before described, is inserted within the sides of the box, leaving a little space between the lard and such top, and secured in place by means of tacks, glue, or in any other convenient manner. I make the tops of the same thickness as the bottoms, and without any band or rim. I then cover the whole box with metallic foil or foil-paper A, securing the same to the box by means of glue or other suitable adhesive material. I usually use either tin or lead foil or foil-paper. It is intended that these packages shall hold a definite quantity of lard, so that it will not be necessary to weigh them after being filled, and so that lard can be retailed both without weighing and without breaking the package.

Having thus fully described my invention, what I claim as new in this subdivision, and desire to secure by Letters Patent, is—

1. The application or use of a tin or lead foil or foil-paper covering for lard-packages constructed of wood or paper, substantially as and for the purposes specified.

2. The process of putting up lard in a light wood or paper casing or box by drawing or pouring the lard therein in a fluid state, and closing up the casing or box by inserting the head so as to leave a small space between the lard and the head to provide for expansion, substantially as specified.

3. As a new article of manufacture, small measured or specific quantities of lard incased in a light wood or paper casing or box, substantially as and for the purposes specified.

CHARLES L. TUCKER.

Witnesses:

L. L. BOND,
E. A. WEST.